US011308258B1

(12) United States Patent
Werner et al.

(10) Patent No.: US 11,308,258 B1
(45) Date of Patent: Apr. 19, 2022

(54) TEXTBOOK CONTENT REORGANIZATION BASED ON CLASSROOM ANALYTICS

(71) Applicant: International Business Machines Corporation, Armonk, NY (US)

(72) Inventors: John S. Werner, Fishkill, NY (US); Tyler Gross, New York, NY (US); Arkadiy O. Tsfasman, Wappingers Falls, NY (US); Brandon M. Kobilka, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/110,422

(22) Filed: Dec. 3, 2020

(51) Int. Cl.
*G06F 40/00* (2020.01)
*G06F 40/106* (2020.01)
*G06F 40/194* (2020.01)
*G06F 3/0483* (2013.01)
*G06V 20/40* (2022.01)

(52) U.S. Cl.
CPC .......... *G06F 40/106* (2020.01); *G06F 3/0483* (2013.01); *G06F 40/194* (2020.01); *G06V 20/40* (2022.01)

(58) Field of Classification Search
CPC ..... G06F 40/106; G06F 40/194; G06F 3/0483
See application file for complete search history.

(56) References Cited

U.S. PATENT DOCUMENTS

| | | | |
|---|---|---|---|
| 5,685,003 A * | 11/1997 | Peltonen | G06F 16/328 715/202 |
| 6,091,930 A | 7/2000 | Mortimer et al. | |
| 6,795,684 B2 | 9/2004 | Stuppy | |
| 8,190,590 B2 * | 5/2012 | Lawlor | G09B 5/00 707/706 |
| 8,239,825 B2 * | 8/2012 | Boss | G06Q 10/10 715/255 |

(Continued)

FOREIGN PATENT DOCUMENTS

| CN | 107545791 B | 3/2020 |
|---|---|---|
| WO | 2018072390 A1 | 4/2018 |

OTHER PUBLICATIONS

Alessandra Anichini Laura Parigi, Re-writing knowledge, re-design textbooks: auto-production of contents in the classroom, Dossier—School Manuals and Educational Media: Research Topics and Perspectives, published Oct. 31, 2019, 10 pages.

*Primary Examiner* — Scott T Baderman
*Assistant Examiner* — Barbara M Level
(74) *Attorney, Agent, or Firm* — Cantor Colburn LLP; Edward Wixted

(57) ABSTRACT

Aspects receiving, by a processor, observation data about an activity. The processor identifies overlapping content between the observation data and a base electronic document. The order of the overlapping content in the observation data is compared, by the processor, to the order of the overlapping content in the base electronic document. The processor changes an order of content in the base electronic document to create a modified electronic document in response to the order of the overlapping content in the observation data being different than the order of the overlapping content in the base electronic document.

20 Claims, 9 Drawing Sheets

(56) References Cited

U.S. PATENT DOCUMENTS

| | | | |
|---|---|---|---|
| 8,352,876 B2* | 1/2013 | Batarseh | G09B 5/02 |
| | | | 434/188 |
| 8,887,042 B2* | 11/2014 | Song | H04L 67/22 |
| | | | 715/255 |
| 8,977,965 B1* | 3/2015 | Ehlen | G06F 3/0482 |
| | | | 715/730 |
| 9,098,407 B2 | 8/2015 | Cho et al. | |
| 9,182,815 B2 | 11/2015 | Small et al. | |
| 10,339,822 B2* | 7/2019 | Brinton | G09B 7/00 |
| 2004/0205645 A1 | 10/2004 | Hoffman | |
| 2005/0255429 A1 | 11/2005 | Robbie | |
| 2013/0147836 A1* | 6/2013 | Small | G06F 3/013 |
| | | | 345/633 |
| 2014/0120516 A1 | 5/2014 | Chiang et al. | |
| 2015/0195095 A1* | 7/2015 | Gillead | H04L 67/02 |
| | | | 726/7 |
| 2015/0206444 A1* | 7/2015 | Vahid | G06T 13/00 |
| | | | 434/362 |
| 2015/0286718 A1* | 10/2015 | Wang | G06F 16/951 |
| | | | 707/738 |
| 2016/0042654 A1* | 2/2016 | Fieldman | G09B 7/00 |
| | | | 434/219 |
| 2016/0117339 A1* | 4/2016 | Raskin | G06F 16/958 |
| | | | 434/309 |
| 2017/0329747 A1* | 11/2017 | Noursalehi | G06N 7/005 |
| 2019/0287415 A1* | 9/2019 | Zavesky | G09B 7/00 |
| 2020/0004493 A1* | 1/2020 | Lee | G06F 3/16 |
| 2020/0174630 A1* | 6/2020 | Rosenberg | G06F 3/0482 |

* cited by examiner

TEXTBOOK CONTENT REORGANIZATION BASED ON CLASSROOM ANALYTICS

BACKGROUND

The present invention relates generally to computer processing, and more specifically, to textbook content reorganization based on classroom analytics.

Teachers, professors, and educators each have their own method or style of teaching a particular course. In many cases, the order of information presented from the textbook and/or provided reading material vary depending on who is teaching the course. It is common for sections or even entire chapters of a textbook to be skipped. It is also common for a teacher to jump to a future section in a textbook, then jump back to an earlier position in a textbook. This can make it difficult for students to locate content that was taught during class when the teacher did not follow the textbook and went over topics in a different order. It may also be difficult for teachers that teach the same topic year after year to determine what ordering worked best for student comprehension so that when building a syllabus for the next time that they teach the class they can repeat the successful sections and reorganize others.

SUMMARY

Embodiments of the present invention are directed to textbook content reorganization based on classroom analytics. A non-limiting example computer-implemented method includes receiving, by a processor, observation data about an activity. The processor identifies overlapping content between the observation data and a base electronic document. The order of the overlapping content in the observation data is compared, by the processor, to the order of the overlapping content in the base electronic document. The processor changes an order of content in the bases electronic document to create a modified electronic document in response to the order of the overlapping content in the observation data being different than the order of the overlapping content in the base electronic document.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
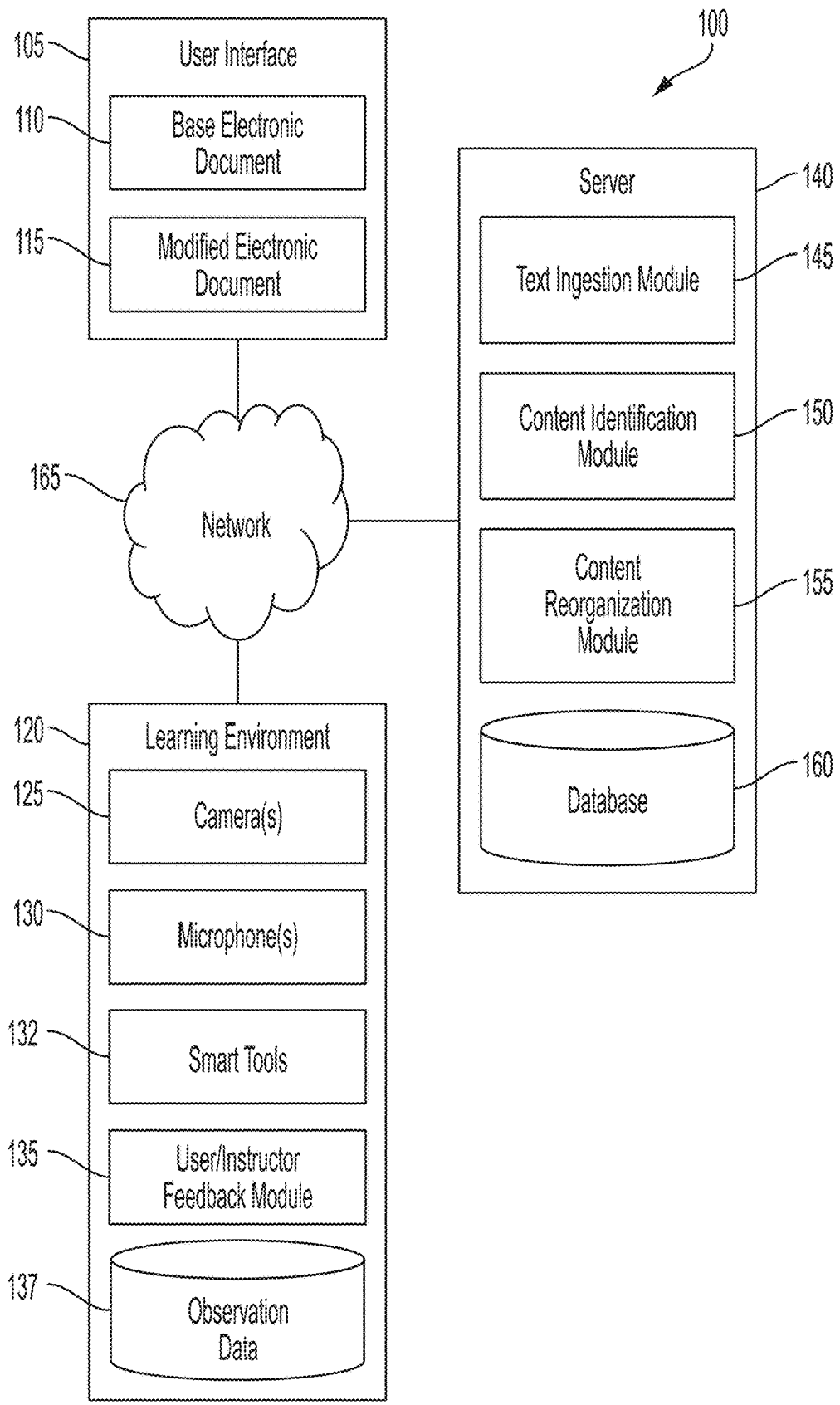
FIG. 1 depicts a block diagram of a configuration for performing textbook content reorganization based on classroom analytics according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention perform textbook content reorganization based on classroom analytics. In accordance with one or more embodiments of the present invention, dynamic electronic content (e.g., a textbook) is reorganized based on detected activity within a classroom. In accordance with one or more embodiments of the present invention, classroom observation data is obtained, for example via a microphone(s) and/or camera(s), while a teacher is conducting the class. The classroom observation data is compared to content of an electronic textbook used by the instructor to determine particular sections of the textbook that were discussed during the class and the order of their discussion. The content of the textbook is reorganized based on the flow indicated by the classroom observation data. The instructor can then decide to use the reorganized electronic textbook the next time that they teach the same class.

The examples provided herein focus on using one or more embodiments of the present invention in a classroom setting. One skilled in the art will appreciate that embodiments are not limited to classroom settings. For example, one or more embodiments of the present invention can be utilized in a workplace setting where an employee(s) is following an instruction manual to perform a process. In a workplace setting, an employee(s) of a company or a user(s) of a product may need to learn/follow a procedure (e.g., within a product installation manual) that is not documented in a convenient order for their specific use case, and one or more embodiments of the present invention may be utilized to reorganize the manual describing the procedure.

One or more embodiments of the present invention leverage inputs such as visual and audio data from cameras and microphones in a physical setting (e.g., a traditional classroom or workplace) or in an online setting (e.g., an online classroom or workplace) to determine the chronology of information being presented during a class. The original electronic content information is subsequently reorganized into a new chronology that matches the order indicated by the visual and audio input. The visual and audio data can include, but is not limited to, a recording of the class, a teacher's lesson plan, an online video, and/or a live process demonstration.

One or more embodiments of the present invention extract key information such as, but not limited to: user input (e.g., students, clients, and/or employees); instructor input (e.g., teacher, coach, lecturer, tutor, and/or supervisor); evaluations (e.g., from Rate My Professor or other evaluation methods); and/or user feedback on the course effectiveness (e.g., with varying degrees of granularity—chapter, subject/ topic, overall course). This extracted information can be used to assist the instructor in making decisions on whether to approve a change to the organization of the textbook. In addition, the extracted information can be utilized by one or more embodiments of the present invention to make cognitive improvements in the future on whether or not to recommend that content be moved.

The extracted information can also be utilized to assist an instructor who is teaching the class for the first time and using the textbook. One or more embodiments of the present invention can provide an instructor insight into what worked and what didn't work in previous iterations of the class. A teacher new to teaching the class can obtain information about a preferred order of using the textbook from any of the past teachers of the class. In this manner, the teacher new to teaching the class can gain valuable insight from teachers who have taught the class in the past.

As used herein, the terms "teacher" or "instructor" refer to all teachers, instructors, professors, educators, and anyone else who may assist others in learning content.

Currently, textbooks (or instruction manuals) are provided to users in a fixed, non-modifiable order. As described previously, teachers often have their own method or style of teaching a particular course. It is common for teachers to skip sections (e.g., paragraphs, sections, chapters, etc.) of a textbook, and to jump back and forth between sections. This inability to modify the organization, or order, of a textbook can cause confusion to students who are trying to follow the new order of material. In addition, it can require a lot of time on the part of the teacher in determining a syllabus for the class. This is exacerbated by new editions of the textbook being published fairly regularly as the teacher will need to go back through the updated textbook and update the syllabus each time the edition changes. Further, it can be difficult for a teacher to remember what aspects of the class worked or didn't work the last time that they taught it using the textbook and they often don't share this information with other teachers of the course.

One or more embodiments of the present invention address one or more of the above noted shortcoming of contemporary systems by providing a system that observes classroom activity and automatically determines an order that a teacher is following through a textbook. A modified textbook that follows the observed order is presented to the teacher as an option for a modified, or reorganized, textbook. The modified textbook can be saved and used by the teacher (and other teachers) the next time that they teach the course. Different modified textbooks can also be created from the base textbook and saved for different versions of the same class (e.g., honors class, high honors class, etc.). One or more embodiments of the present invention provide the technical benefit of saving storage costs by storing the content of a textbook once and providing a modified textbook by adding a new index that includes entries that point to the portions of the content in a modified order (when compared to the index in the base textbook).

One or more embodiments of the present invention provide content reorganization within electronic content by inputting and analyzing base electronic content, listening/ viewing learning environment activity, and associating content discussed with content within the base electronic content. User and instructor feedback are analyzed using a content reorganization module, and based on the analysis, if it is deemed that a different ordering of content within the electronic content had positive feedback, a modified version of the electronic content with reorganized content is generated.

Turning now to FIG. 1, a block diagram 100 of a system configuration for performing textbook content reorganization based on classroom analytics is generally shown in accordance with one or more embodiments of the present invention. All or a portion of the components shown in FIG. 1 can be implemented by computer 901 of FIG. 9 and/or by a cloud computing node 10 of FIG. 7. The components shown in the embodiment of FIG. 1 include a user interface 105, a network 165, a learning environment 120, and a server 140.

User interface 105 may be implemented by any device capable of displaying text, images, and/or audio data from electronic content. Examples include, but are not limited to a laptop computer, a mobile device, a tablet, a smart home assistant, a wearable device, and/or monitor connected to an enterprise server. The user interface 105 shown in FIG. 1 is configured to display base electronic document 110 (also referred to herein as "base electronic content") and modified electronic document 115 (also referred to herein as "modified electronic content" or "reorganized electronic content"). In accordance with one or more embodiments of the present invention, the base electronic document 110 is the electronic form (e.g., .pdf, .docx, etc.) of any content (e.g., textbook, workbook, installation manual, etc.) and the modified electronic document 115 is an edited version of the base electronic document 110 with rearranged content after modification by content reorganization module 155 of server 140 as described herein below. In accordance with one or more embodiments of the present invention, the modified electronic document 115 may be marked (e.g., displayed in a different color, underlined, etc.) such that a user accessing the reorganized electronic content via the user interface 105 knows that content has moved from its original location in the base electronic document 110. In accordance with one or more embodiments of the present invention, a user can hover over the modified content or display a message to determine where moved content appears within the base electronic document 110.

In accordance with one or more embodiments of the present invention, content of the base electronic document 110 is broken up into a plurality of portions such as, but not limited to pages, paragraphs, sections, chapters, and parts. Each portion can be stored once at a storage location in a storage device or other memory and accessed via indices. For example, a base electronic document 110 may have content portions A, B, C, D. The base electronic document 110 can include an index with entries pointing to the storage location of each of these portions in the order A, B, C, D, while the modified electronic document 115 can include an index with entries pointing to the storage locations of each of these portions in the order A, C, D, B. Thus, in accordance with one or more embodiments of the present invention the order of the content can be changed by modifying the index that points to the portions of the content.

In accordance with one or more embodiments of the present invention, there are multiple versions of each electronic document. Referring back to the previous example, an additional modified electronic document can include an index with entries pointing to storage locations in the order A, D, C, B. A teacher can select the modified electronic document 115 to teach a class, and the observation data from the class can be compared to the modified electronic document 115. In this example, the modified electronic document 115 can be reordered to generate the additional modified electronic document. In this scenario, the modified electronic document 115 becomes the base electronic document 110 and the additional modified electronic document is the modified electronic document 115.

Figure 9:
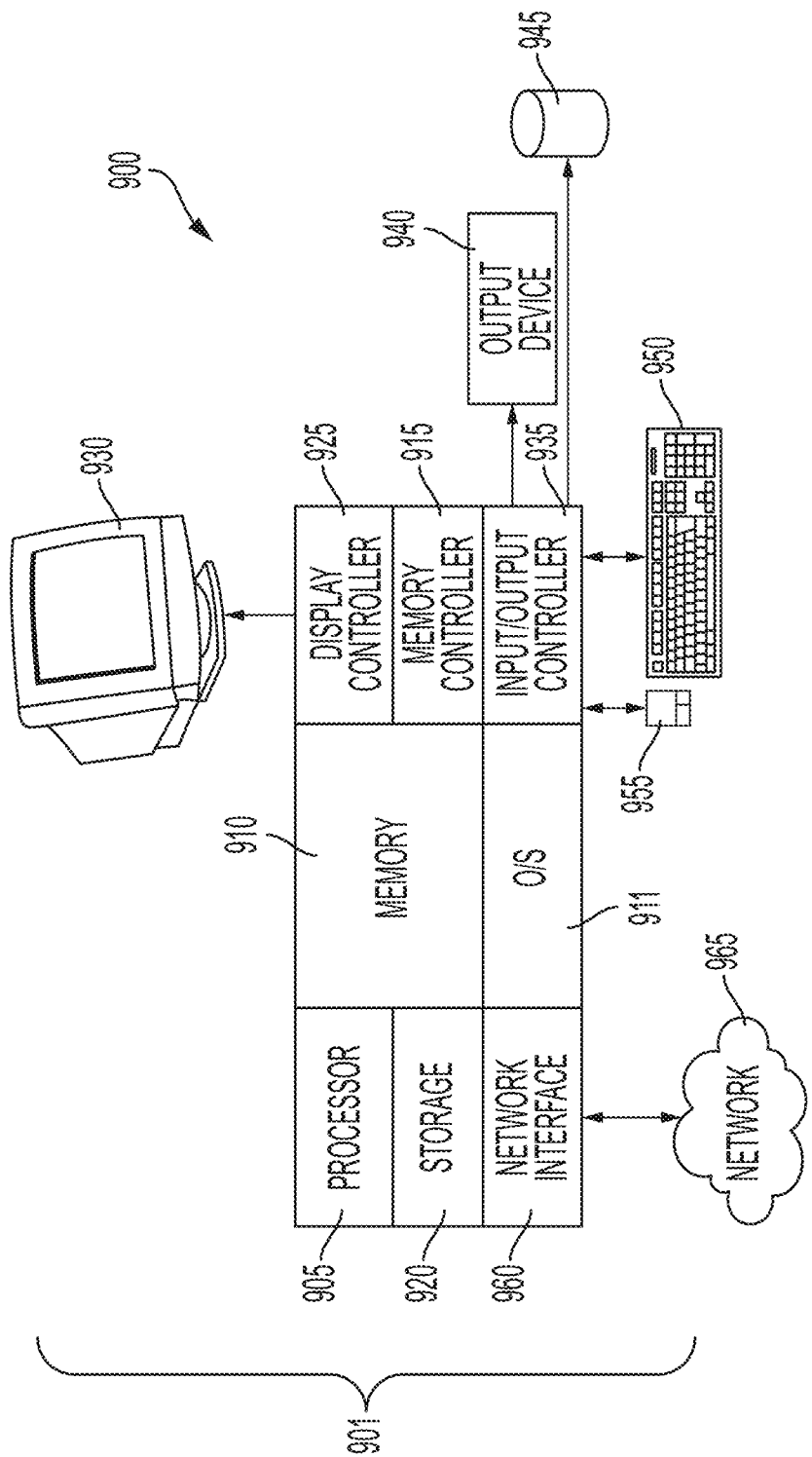
FIG. 9 illustrates a system for performing textbook content reorganization based on classroom analytics according to one or more embodiments of the present invention.

The learning environment 120 shown in FIG. 1 includes a camera(s) 125, a microphone 130, smart tools 132, a user/instructor feedback module 135, and observation data 137, all of which can be included in or can communicate with, a computer system such as computer system 900 of FIG. 9. The learning environment 120 can be a physical location such as a classroom in a school, or it can be an online environment via an online tool such as, but not limited to Microsoft Teams® and Zoom.

In accordance with one or more embodiments of the present invention, one or more cameras 125 are placed around the learning environment to capture visual data pertaining, for example, to what was written (e.g., on a whiteboard/blackboard), what was presented through a projector, any objects that may have been utilized to present content to the users (e.g., science experiment), and/or user and instructor reactions and user engagement. One or more cameras 125 may also be part of a user device (e.g., a built-in camera on a laptop) for remote users and/or online content.

One or more microphones 130 may be placed around the learning environment to capture audio data pertaining to what was taught by the instructor, questions that were asked by the users, or any other audio content such as a recorded movie, television show, or presentation that relates to user coursework. In accordance with one or more embodiments of the present invention, microphone 130 is part of camera 125. In one or more other embodiments, microphone 130 is part of a user device (e.g., a built-in microphone on a mobile device) for remote users and/or online content The visual and audio data captured for a class can be stored locally as observation data 137 which is sent to the server 140 for storage in database 160 where it is used for subsequent analysis. In one or more other embodiments, the observation data 137 is sent directly to the server 140 as it is being captured without first being stored locally in the learning environment 120.

In accordance with one or more embodiments of the present invention, smart tools 132 include any smart or Internet of Things (IoT) device capable of extracting information taught in class (online or in person) and may include, but is not limited to: smart boards (e.g., RICOH Interactive Whiteboard powered by IBM Watson®); smart pens; keystroke logging for computers and laptops of instructors and/or users; and/or tracking what was typed on a touchscreen device by instructors and/or users. In accordance with one or more embodiments of the present invention, the smart tools 132 are utilized to extract written and/or typed data using smart boards, smart pens, and/or keystroke logging. In accordance with one or more embodiments of the present invention, files that were presented, or shared (e.g., PowerPoint, PDF, video) can be extracted directly from the devices so that they don't need to be captured with a camera. The data collected by the smart tools 132 can be stored as observation data 137 or sent directly to the server 140.

The user/instructor feedback module 135 collects feedback from users (e.g., students) and instructors about a particular class session or a group of class sessions. Examples of feedback that can be collected includes, but is not limited to: student feedback on their understanding of how a topic was taught; instructor feedback on their impressions of user understanding and whether they believe their ordering of classroom materials yielded positive results; analysis of questions asked during content delivery; analysis of facial expressions (e.g., understanding or confusion); reviews of instructors (e.g., from class evaluations or Rate My Professor metrics); and test grades. In accordance with one or more embodiments of the present invention, users may provide feedback via user interface 105

The camera(s) 125, microphone(s) 130, smart tools 132, user/instructor feedback module 135 are examples of some of the ways to collect observation data about a class. One skilled in the art will recognize that other manners of collecting observation data can also be implemented by one or more embodiments of the present invention. For example, in one or more embodiments of the present existing audience response systems (ARSs) (e.g., Slido, Poll Everywhere, Glisser, Crowdpurr, Crowd Mics, TurningPoint®, Pigeonhole® Live, and Ombea®) are used to monitor users and to gather observation data.

FIG. 1 also depicts server 140 which as shown in the embodiment of FIG. 1 includes text ingestion module 145, content identification module 150, content reorganization module 155, and database 160.

In accordance with one or more embodiments of the present invention, text ingestion module 145 is utilized to read in and analyze base electronic document 110 in order to extract keywords and develop keyword associations. The text ingestion module 145 can also process any other uploaded content such as, but not limited to a syllabus, handouts, and/or files created by the teacher. In accordance with one or more embodiments of the present invention, the text ingestion module is also used by content identification module 150 after speech to text conversion is performed. Application programming interfaces (APIs) into natural language processing (NLP) tools such as, but not limited to Watson Natural Language Understanding (NLU) and Watson Natural Language Classifier (NLC) from IBM can be utilized by text ingestion module 145 to analyze base electronic document 110. Other APIs/tools that can be utilized to perform NLP include, but are not limited to Cloud Natural Language from Google, and Text Analytics API from Microsoft. In accordance with one or more embodiments of the present invention, text ingestion module 145 leverages NLP tools to analyze base electronic document 110 information to normalize the dataset into six categories: concepts, relations, entities, categories, keywords, semantic roles. In accordance with one or more embodiments of the present invention, word/information proximity, semantic structure, and grammar are analyzed by text ingestion module 145.

Content identification module 150 of FIG. 1 receives and analyzes the observation data 137 received from learning environment 120 to identify where content that was discussed during a class is located within base electronic document 110. APIs such as but not limited to Watson Speech to Text, Watson Tone Analyzer, Watson Personality Insights, and/or Watson Visual Recognition from IBM can be utilized by one or more embodiments of the present invention to analyze the observation data 137. As described previously, the observation data 137 can include visual and audio data captured by camera(s) 125, microphone(s) 130, and/or user/instructor feedback module 135 (e.g., when an ARS is used). These API's can be used to analyze classes taught in a physical setting and classes taught online. In accordance with one or more embodiments of the present invention, content identification module 150 compares combinations of keywords in the observation data to determine the topic(s) being discussed and which section(s), or portions, of base electronic document 110 matches most closely with content being discussed during the class.

Still referring to the embodiment shown in FIG. 1, content reorganization module 155 takes the output of content identification module 150 as well as data from user/instructor feedback module 135 to determine how to reorder content from base electronic document 110 to create/update modified electronic document 115. In accordance with one or more embodiments of the present invention, the modified electronic document 115 is generated if user/instructor feedback module 135 indicates that there was positive feedback and/or student understanding of the class that was presented. API's such as NLU and NLC can be used to analyze user feedback received via user/instructor feedback module 135.

In accordance with one or more embodiments of the present invention, database 160 of FIG. 1 contains the training data utilized by content identification module 150 and content reorganization module 155, any changes that were made to base electronic document 110 to create modified electronic document 115 for a specific course, and data for modified electronic document 115 across many courses/learning environments. For each textbook, the database 160 can include a single copy of the content and one or more indices into the content to specify an order of presentation of the content. In one or more other embodiments, multiple copies of the content can be stored in the database 160.

The training data can include feedback from instructors/users on whether the correct section that was discussed during the course was properly identified or may allow instructors/users to find and select the content that was discussed to assist system learning for content identification. Training data can include user feedback on whether content was understood based on the order it was taught in the classroom. The training data can be used to initialize and/or to improve the processing performed by the text ingestion module 145, the content identification module 150, and the content reorganization module 155. Data obtained across many courses/learning environments can be used to develop insights for modification for changes in future editions of the base electronic document 110 and to assist instructors who are starting a new class or switching to base electronic document content to see what the trends are amongst others teaching from the same base electronic document 110.

The network 165 shown in FIG. 1 can be implemented by any one or more wired or wireless networks known in the art such as, but not limited to a cellular network, a radio network, a wide area network (WAN), a local area network (LAN), and/or the Internet.

For ease of description, FIG. 1 shows a single user interface 105 and a single learning environment 120. One skilled in the art will recognize that one or more embodiments of the invention include multiple user interfaces 105 and/or multiple learning environments 120. In addition, all or a portion of the components shown in the user interface 105, server 140, and learning environment 120 can be located in different computers.

The embodiments described herein with respect to block diagram 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
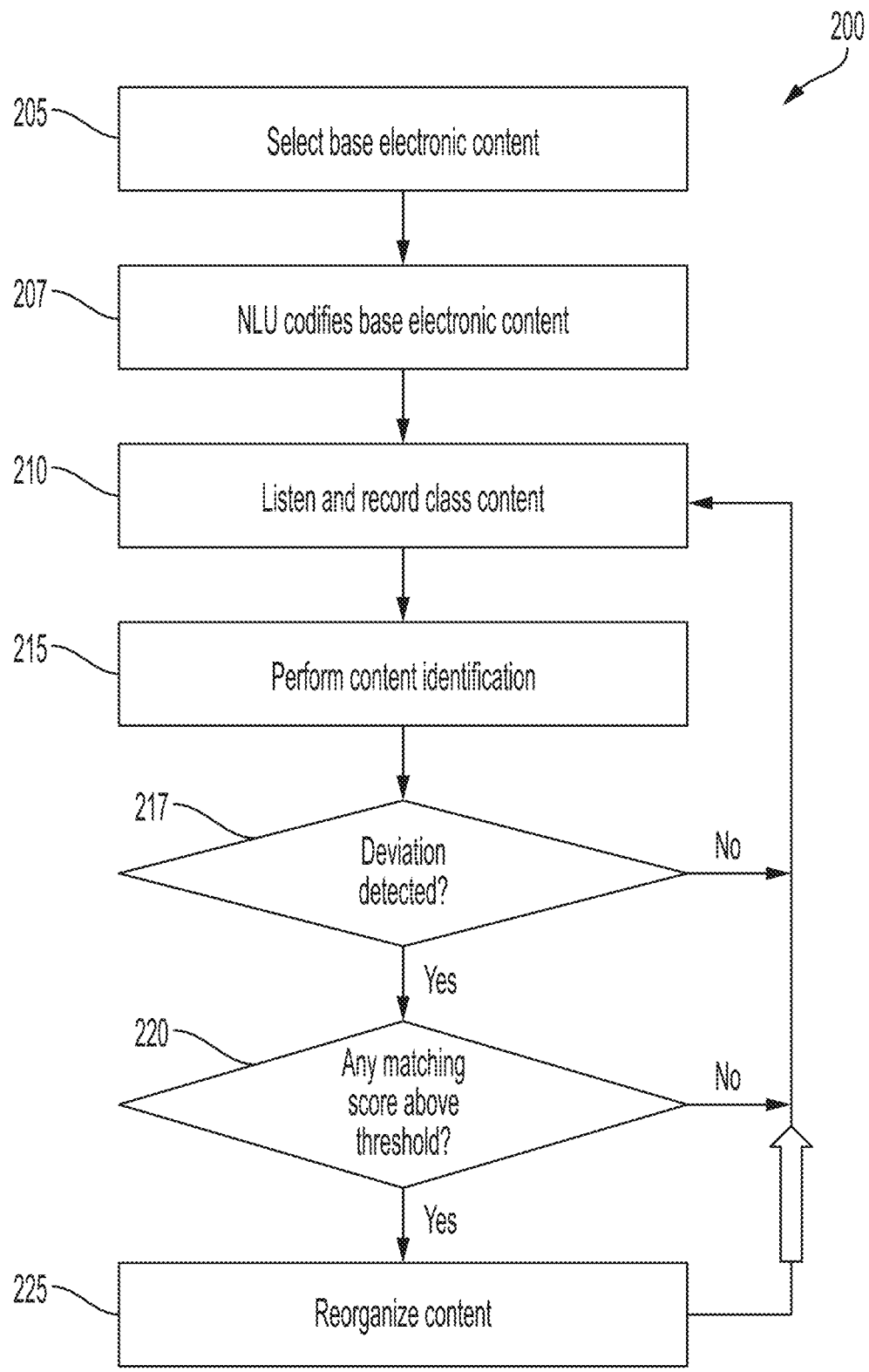
FIG. 2 depicts a flow diagram of a method for performing textbook content reorganization based on classroom analytics according to one or more embodiments of the present invention.

Turning now to FIG. 2, a flow diagram of a method 200 for performing textbook content reorganization based on classroom analytics is generally shown in accordance with one or more embodiments of the present invention. All or a portion of the processing shown in FIG. 2 can be performed, for example, by the system shown in FIG. 1. The method 200 shown in FIG. 2, generates modified electronic content, such as modified electronic document 115 of FIG. 1, from base electronic content, such as modified electronic document 110, where the modified electronic content tracks the order in which content was taught by an instructor.

At block 205, base electronic content is selected for example, by a teacher, professor, or instructor for a class, job, or task. At block 207, NLU is utilized to codify the base electronic content. In accordance with one or more embodiments of the present invention, the NLU is performed by the text ingestion module 145. In accordance with one or more embodiments of the present invention, Watson NLU is used to analyze the base electronic content to normalize the base electronic content into six categories: concepts, relations, entities, categories, keywords, and semantic roles.

Figure 3:
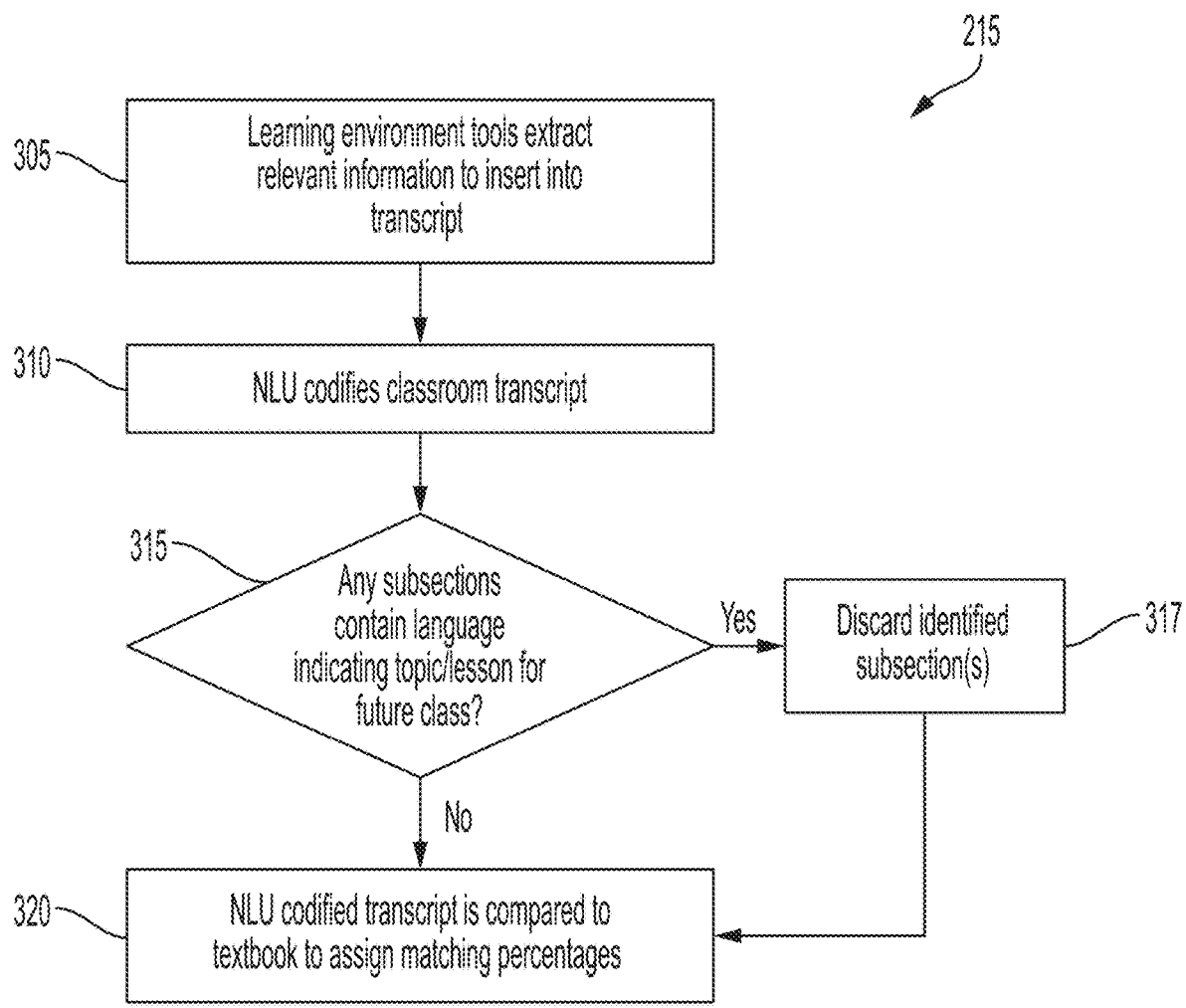
FIG. 3 depicts a flow diagram of a method for performing content identification according to one or more embodiments of the present invention.

At block 210 of FIG. 2, a class is monitored as it is being taught and observation data, such as observation data 137 of FIG. 1, is generated by observing and recording the content of the class. The taught content may be from in-person learning or online learning and may be collected from one or more cameras, such as camera 125 of FIG. 1, and one or more microphones, such as microphone 130 of FIG. 1, located either in the physical classroom or as part of a user device (e.g., mobile phone and/or laptop). Processing continues at block 215 with determining an order that materials covered in the base electronic content were taught during the class that was monitored, or observed, at block 210. The processing at block 215 can be performed by the content identification module 150 of FIG. 1. The processing at block 215 can include creating and codifying a transcript of the class being monitored, using the codified transcript to determine the position of the recorded content within the base electronic content, and providing a match score that indicates a level of confidence in the determined position. In accordance with one or more embodiments of the present invention, the codifying includes using Watson NLU to analyze the transcript to normalize the content of the transcript into six categories: concepts, relations, entities, categories, keywords, and semantic roles. FIG. 3 below depicts an embodiment of the processing performed at block 215 to identify the content in the textbook that was taught during the class.

When block 215 is completed, processing continues at block 217 with determining, based on the output of block 215, whether the teacher deviated from the base textbook, or base electronic content, while teaching the class. In accordance with one or more embodiments of the present invention, deviation is identified when the highest percentage match for a given section, or portion, as identified at block 215, is out of order from the current version of the content being used (which may be the base electronic content as published or the most recent modified electronic content).

If it is determined, at block 217, that the teacher did not deviate from the base textbook, then processing continues at block 210 with monitoring a class that utilizes the textbook codified at block 207 (or other codified textbooks). If it is determined, at block 217, that the teacher deviated from the base textbook, then processing continues at block 220 with determining whether any of the match scores generated at block 215 are above, or meet, a threshold value (e.g., 75%, 90%, 51%). The threshold value is programmable and can be set to different values for different textbooks, different types of classes, and different teachers.

Figure 5:
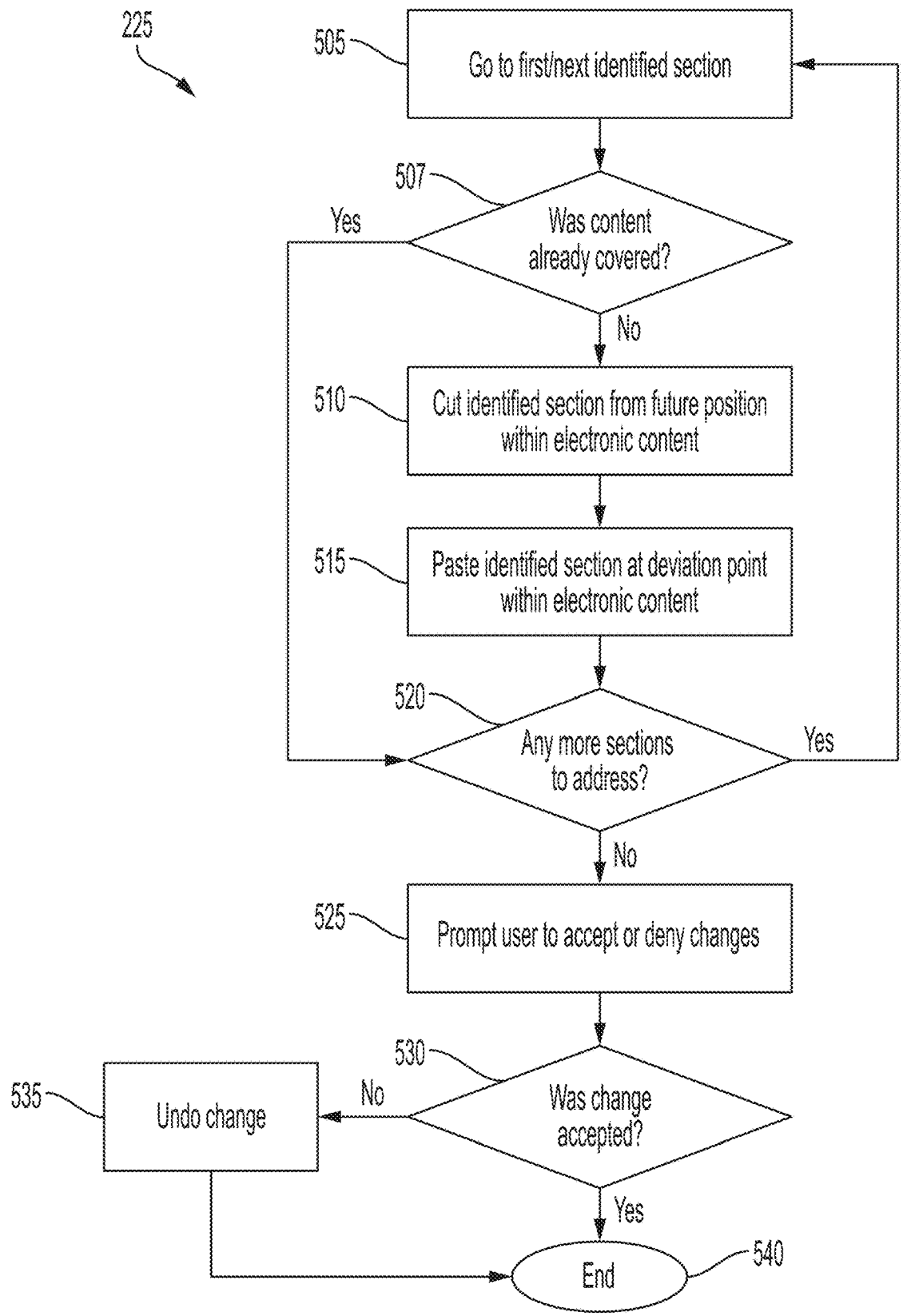
FIG. 5 depicts a flow diagram of a method for reorganizing content according to one or more embodiments of the present invention.

If it is determined, at block 220, that none of the match scores generated at block 215 are above the threshold value, then processing continues at block 210 with monitoring a class that utilizes the textbook codified at block 207 (or other codified textbooks). If it is determined, at block 220, that at least one of the match scores generated at block 215 is above the threshold value, then processing continues at block 225 with reorganizing the base electronic content to generate a modified electronic document. FIG. 5 depicts an embodiment of the processing performed at block 225 to reorganize the content in the textbook to generate a modified textbook. Once the processing at block 225 is complete, processing continues at block 210 with monitoring a class.

In accordance with one or more embodiments of the present invention, the observation data may be continuously sent to the server 140 for analysis during a lesson so that the looping happens while the instructor is teaching. In one or more other embodiments, the observation data is sent to the server 140 for analysis after an entire class is complete so the looping happens for the next class (or session or workshop or meeting). In one or more other embodiments, the observation data is sent to the server 140 for analysis after an entire course (that includes multiple classes) is complete.

The process flow diagram of FIG. 2 is not intended to indicate that the operations are to be executed in any particular order, or that all of the operations shown in FIG. 2 are to be included in every case. Additionally, the processing shown in FIG. 2 can include any suitable number of additional operations.

Turning now to FIG. 3, an embodiment of processing that can be performed at block 215 of FIG. 2 is generally shown in accordance with one or more embodiments of the present invention. The flow diagram of FIG. 3 depicts an embodiment of matching content within the transcript that was created from the observation data to the base electronic content. The flow diagram shown in FIG. 3 can be implemented by content identification module 150 of FIG. 1. It should be noted that if the teacher has already taught the class in the past and modified electronic document 115 has been created, the previously created modified electronic content is the base electronic content and new modified content will be created using the previously created modified content as a base.

At block 305, a transcript of the class is generated using the audio observation data which includes audio data generated by one or more microphones, such as microphone 130 of FIG. 1. The transcript can be generated using any known speech to text software known in the art. Also, at block 305, tools in the learning environment, such as those shown in the learning environment 120 of FIG. 1, are used to extract relevant information, or observation data, to insert into the transcript of the class. The inserted observation data can include, but is not limited to, text, video, and/or images. In accordance with one or more embodiments of the present invention, visual recognition is used on recorded video from one for cameras to identify images (e.g., presentation slides, overhead projector images, images from movies shown in class) and/or text written on a whiteboard or blackboard. The images may be compared to a large database of images to perform a reverse image search to identify what is being shown to the class. Any reverse image search tool known in the art can be utilized such as, but not limited to Reverse Image Search from Google and TinEye Reverse Image Search. In one or more embodiments of the present invention, images that are used for comparison and identification by visual recognition software may be stored on database 160 of FIG. 1 and may come from a plurality of content (e.g., other textbooks, websites, etc.) and other learning material.

Once all classroom data has been extracted and inserted into the transcript at block 305, processing continues at block 310 to perform NLU codification of the completed transcript of the observation data in a manner similar to that used in block 207 of FIG. 2 to codify the base electronic content. For example, the NLU codification can be performed using Watson NLU from IBM to analyze the transcript content information in order to normalize the transcript into six categories: concepts, relations, entities, categories, keywords, and semantic roles. The processing at block 310 breaks the transcript into multiple portions, as shown below in FIG. 4 which depicts a transcript 400 with multiple subsections 405, 410, 415, 420, 425, 428, and 430.

Once the processing at block 310 is completed, processing continues at block 315 to determine if any of the subsections contains language indicating topics or lessons for a future class. The processing at block 315 can include looking for indictors in the transcript such as, but not limited to the following types of phrases: "Next class, we'll cover chapter 8."; We'll go deeper into topic ABC later this semester."; and/or "Great question! We'll answer that when we get to the lesson on topic XYZ." If the language in the transcript is identified that describes a topic or lesson for a future class (or session or workshop or meeting), then processing continues at block 317 with discarding, or ignoring, these subsections. This prevents content that will be covered in a future class from being reordered as part of the modified content. Processing then continues at block 320.

If, at block 315, there is no language in the transcript that is identified as describing a topic or lesson for a future class, processing continues at block 320. At block 320, content of the NLU codified transcript of the observation data is compared to the NLU codified base electronic content to assign matching percentages to each identified subsection. An example of this is shown in the transcript 400 of FIG. 4 below with matching scores 435, 440, 445, 450, 455, 457, and 460. In accordance with one or more embodiments of the present invention, the two codified datasets (the base electronic content and the transcript) are given a match score for five different degrees of information granularity: individual words; strings of words; sentences; paragraphs; and large sections/chapters. The five match scores are then analyzed to determine an aggregate matching score that is the indicator used by the system to determine what parts of the base electronic content are being covered in the class. In accordance with one or more embodiments, plagiarism checker tools (e.g., Duplichecker, Copyleaks, and Plagiarisma) can be utilized to perform all or portion of the comparison analysis. The output from block 320 is a transcript, such as transcript 400 of FIG. 4, that is split into subsections, with matching scores assigned to each subsection.

The process flow diagram of FIG. 3 is not intended to indicate that the operations are to be executed in any particular order, or that all of the operations shown in FIG.

3 are to be included in every case. Additionally, the processing shown in FIG. 3 can include any suitable number of additional operations.

Figure 4:
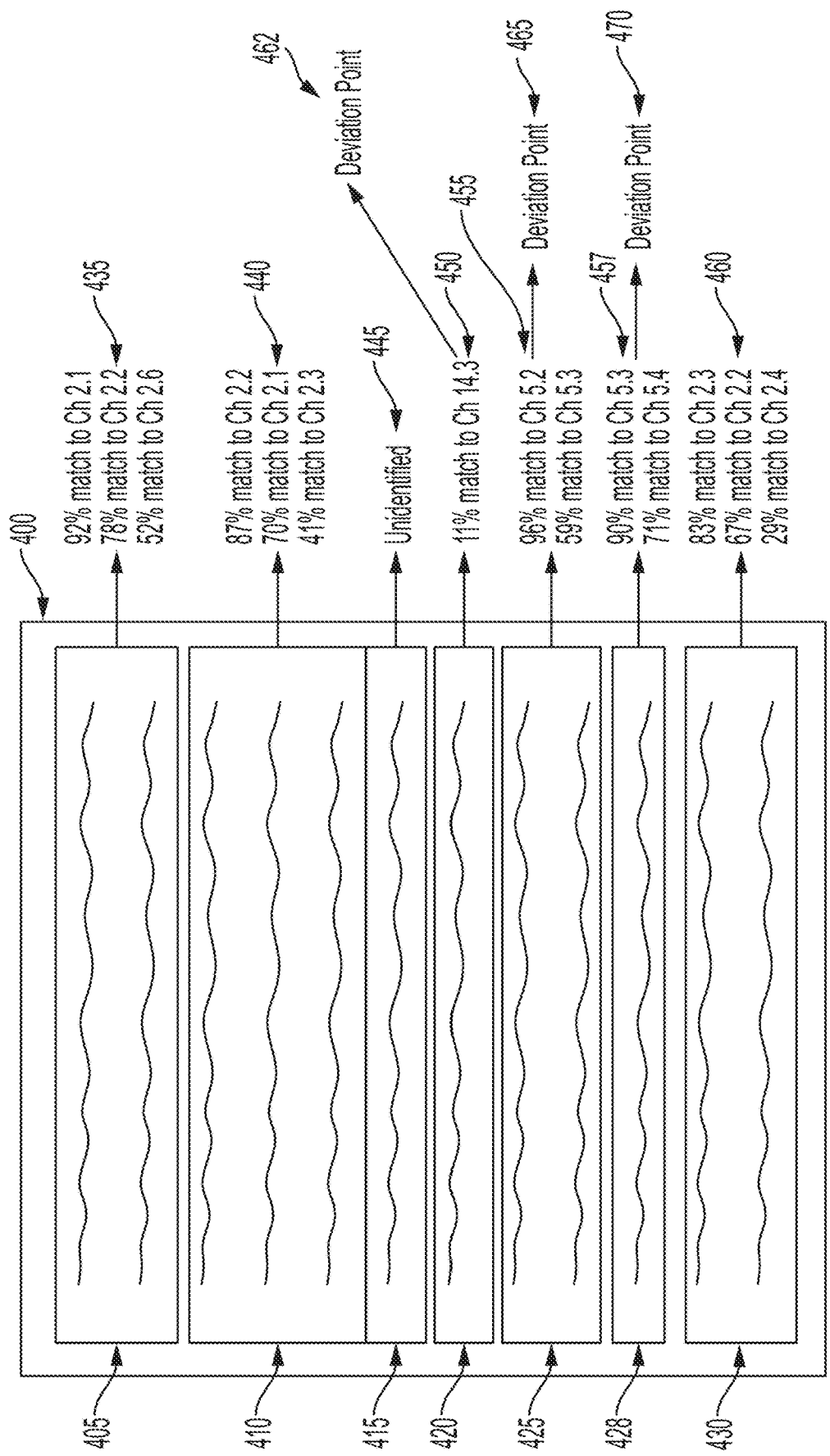
FIG. 4 depicts a transcript with matching scores and deviation points according to one or more embodiments of the present invention.

Turning now to FIG. 4, an example of a transcript 400 with matching scores is generally shown in accordance with one or more embodiments of the present invention. In accordance with one or more embodiments of the present invention, the transcript 400 and other data shown in FIG. 4 can be generated by content identification module 150 of FIG. 1. The transcript 400 shown in FIG. 4 includes text portions, or subsections 405, 410, 415, 420, 425, 428, and 430 of the classroom observation data. In addition, each text subsection shown in FIG. 4 has one or more matching scores 435, 440, 445, 450, 455, 457, and 460 that relate to portions of the electronic base document.

In accordance with one or more embodiments of the present invention, text to generate the transcript 400 is extracted directly from speech to text software such as, but not limited to Watson Test to Speech from IBM. Content of the transcript can be supplemented with visual presentation material (e.g., Microsoft® PowerPoint® and video) extracted using visual recognition software (e.g., Watson Visual Recognition from IBM), content written on a whiteboard extracted using visual recognition software, content from a smart whiteboard, and/or content written using a smart pen. The beginning and ending of text subsections in the transcript 400 can be found using NLP software. The subsections in the transcript 400 can be any short grouping of words such as, but not limited to a sentence or a paragraph.

As shown in FIG. 4 several of the subsections 405, 410, 425, and 430 are depicted as matching multiple portions of content in the base electronic document 110 and the portions are displayed in order of the highest matching percentage to the lowest matching percentage. For example, subsection 405 may reflect the beginning of a class where the teacher is teaching Chapter 2 of base electronic document 110. The teacher begins with Section 2.1 which has the highest matching score as shown in 435. While teaching Section 2.1, the teacher may touch on content from Section 2.2 and/or Section 2.2 may have similar keywords since it builds on the content of Section 2.1. Because of this, 435 depicts a 78% matching score (second closest match) to Section 2.2.

Some subsections may be unidentified due for example, to an announcement being made over an intercom system during the class that does not match class material or the instructor or a user getting sidetracked and talking about something other than class/session/workshop/meeting material (e.g., plans for the weekend). In FIG. 4, subsection 415 does not match to content in the base document as indicated at 445.

Erroneous matches may also be identified as shown at 450 which corresponds to subsection 420. Erroneous matches can happen for the same reasons as an unidentified subsection except that some keywords overlap with material within the textbook (e.g., a history teacher mentions visiting a science museum when they were on vacation in New York and describes their favorite exhibit which has a minor relation (e.g., an 11% match as indicated at 450) to content within a science text book. Note that the matching percentage is very low and will be filtered out of the list when deciding whether to move content later (i.e., this identified section will not be moved).

FIG. 4 also depicts deviation points 462, 465, and 470. In accordance with one or more embodiments of the present invention, deviation points are identified based on the highest matching score for a text subsection of the transcript being outside the typical flow of base electronic content 110. In the example transcript 400 shown in FIG. 4, the majority of the class is spent discussing content within Chapter 2 so all subsections that reference content outside of Chapter 2 are flagged as deviation points no matter the score (low matching scores will be filtered out or ignored at block 220 of FIG. 2).

Turning now to FIG. 5, an embodiment of processing that can be performed at block 225 of FIG. 2 is generally shown in accordance with one or more embodiments of the present invention. The flow diagram of FIG. 5 depicts an embodiment of reorganizing, or changing the order, of content in a base electronic document (e.g., a base textbook) to create a modified electronic document (e.g., a modified textbook) that follows the flow of an observed class that uses the base electronic document (textbook).

Block 505 is the start of an iterative loop of blocks 505 through block 520 that is performed for each of the subsections, or portions, of a transcript where a deviation with a matching score higher than a predetermined programmable threshold (e.g., 50%, 75%, 90%, 95%) was detected. Referring back to FIG. 4, deviation point 462 corresponds to subsection 420 and has a matching score of 11% with Chapter 14 Section 3 of the base textbook. Deviation point 465 corresponds to subsection 425 and has a matching score of 96% with Chapter 5 Section 2 and a matching score of 59% with Chapter 5 Section 3. Deviation point 470 corresponds to subsection 428 and has a matching score of 90% with Chapter 5 Section 3 and a matching score of 71% with Chapter 4 Section 4. If the threshold is set to 70%, then the iterative loop will be performed for subsection 425 and Chapter 5 Section 3, subsection 428 and Chapter 5 Section 3, and subsection 428 and Chapter 5 Section 4. Note that if a deviation point has matching scores that are above the threshold for multiple portions of the base electronic content, then each of the portions are added to the list for processing by the loop from block 505 to 520.

The loop begins at block 505 with accessing a first or next portion of the base electronic content on the list. At block 507, it is determined if the portion of the base electronic content was already covered earlier in the class (or group of classes). For example, a teacher may go over content that was previously discussed during a review class before an exam. In another example, referring to FIG. 4, the instructor may have already covered Chapter 5 Section 2 (deviation point 465) when teaching Chapter 1 in a previous class. In this case, the yes branch of block 507 is taken because the content in the portion of the base electronic document was already moved to an earlier position within the modified electronic content. If the portion of the base electronic document has already been mentioned and it appears earlier within the modified electronic content (or proposed modified electronic content) then processing continues at block 520 to determine if there are any other portions of the base electronic document on the list.

If, as determined at block 507, the content of the portion of the base electronic content has not already been covered, processing continues at block 510 to cut, the portion from its current location in the modified electronic content, and at block 515 the portion that was cut is pasted at its corresponding deviation point in the modified electronic content. In this manner, the loop changes the order of content in the base electronic content to create modified electronic content. Processing continues at block 520. If there are more portions of the base electronic content on the list to be analyzed, processing continues at block 505. If there are no more portions of the base electronic content on the list to be analyzed, processing continues at block 525.

At block 525 of FIG. 5, the user (e.g., teacher) is prompted to accept or to reject the changes to the modified electronic content that were made at block 515. Block 525 begins a learning process by taking participant (e.g., student) and/or teacher feedback to determine if a portion of the base electronic document was properly identified and moved correctly. One or more embodiments of the present invention can learn specific teaching styles on a per instructor basis to adjust threshold matching percentages and/or vernacular to be taken into account when calculating a matching score. At block 530, it is determined if a change was accepted by the teacher. If the change was accepted, processing ends at block 540. If the change was not accepted, processing continues at block 535 with undoing the change(s) in the modified base electronic content that was not accepted and processing ends at block 540. Undoing the change can include moving the content in the moved portion(s) of the modified electronic document back to its original position. Over time, the system will improve and the chance of a user rejecting a change will be decrease.

The process flow diagram of FIG. 5 is not intended to indicate that the operations are to be executed in any particular order, or that all of the operations shown in FIG. 5 are to be included in every case. Additionally, the processing shown in FIG. 5 can include any suitable number of additional operations.

Figure 6:
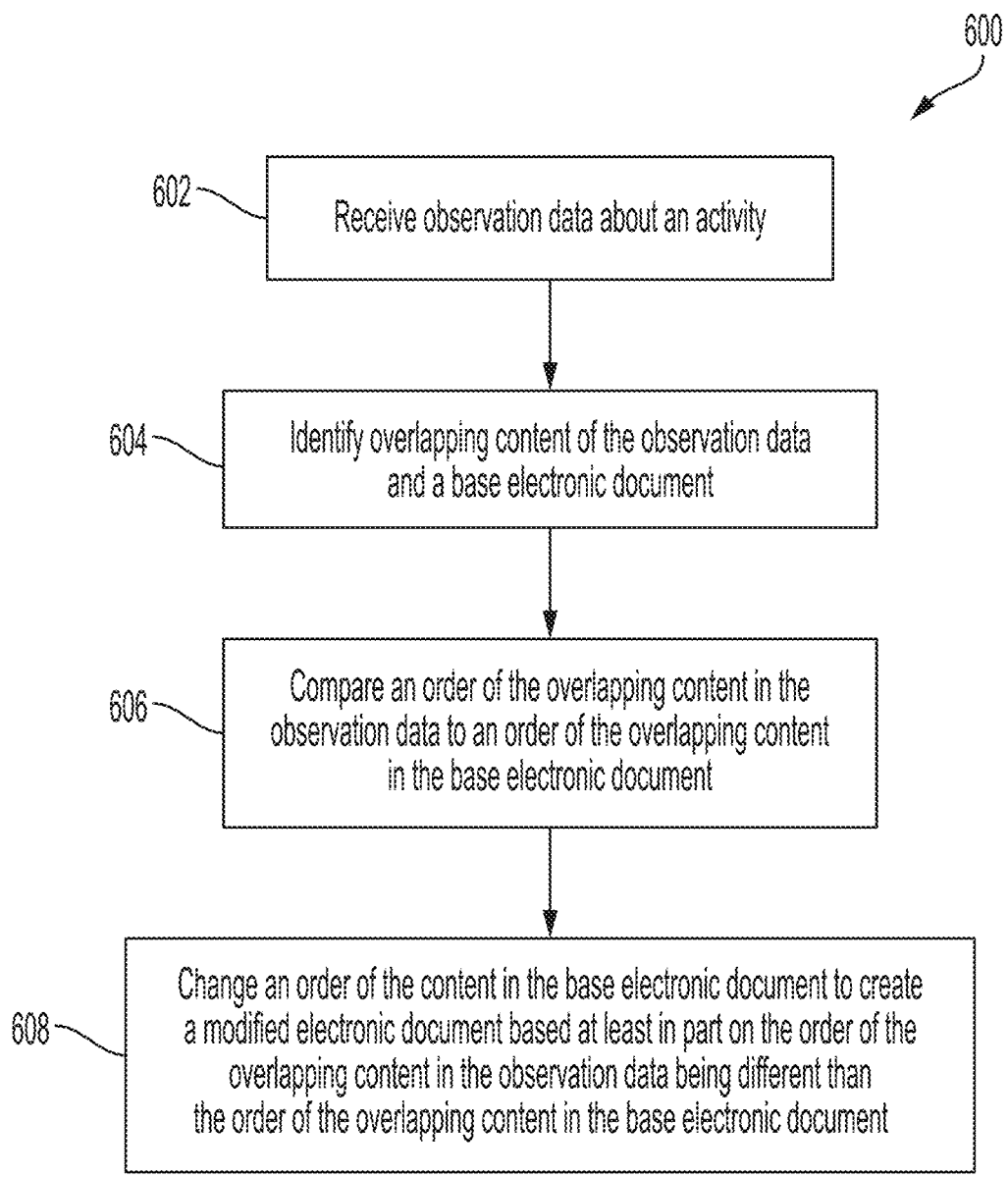
FIG. 6 depicts a flow diagram of a method for performing textbook content reorganization based on classroom analytics according to one or more embodiments of the present invention.

Turning now to FIG. 6, a flow diagram of a method 600 for performing textbook content reorganization based on classroom analytics is generally shown in accordance with one or more embodiments of the present invention. All or a portion of the processing shown in FIG. 6 can be performed by server 140 of FIG. 1.

At block 602, observation data about an activity is received for example, by content identification module 150 of FIG. 1. The observation data can include one or both of visual and audio data. At block 604 overlapping content of the observation data and a base electronic document is identified. In accordance with one or more embodiments of the present invention, the activity is a learning activity in a classroom and the base electronic document is a textbook. In accordance with one or more embodiments of the present invention, the activity is a workplace procedure (e.g., an installation of a product or a manufacturing procedure) and the base electronic document is an instruction manual.

At block 606, an order of the overlapping content in the observation data is compared to an order of the overlapping content in the base electronic document. At block 608 based on the comparison at block 606 indicating that an order of the overlapping content in the observation data is different than the order of the overlapping content in the base electronic document, the order of the content in the base electronic document is changed to create a modified electronic document. The order can be changed by content reorganization module 155 of FIG. 1 and the modified electronic document can be stored in database 160 of FIG. 1. In accordance with one or more embodiments of the present invention, when feedback is received from a teacher of classroom learning activity and the order of content in the modified electronic document is based at least in part on the feedback. For example, the teacher may be presented with proposed changes to the order of the modified electronic document and be given the ability to approve or to deny each proposed change. In another example, the teacher or student may be able to provide feedback about their perception of how well particular portions of the class went. This type of feedback can be used to determine what changes should be proposed.

In accordance with one more embodiments of the present invention, the base electronic document is analyzed, by text ingestion module 145 of FIG. 1 for example, to extract keywords and to develop keyword associations that are used to identify overlapping content of the observation data and the base electronic document. In accordance with one or more embodiments of the present invention, the modified electronic document has the same content of the base electronic document, however the content may be in a different order.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
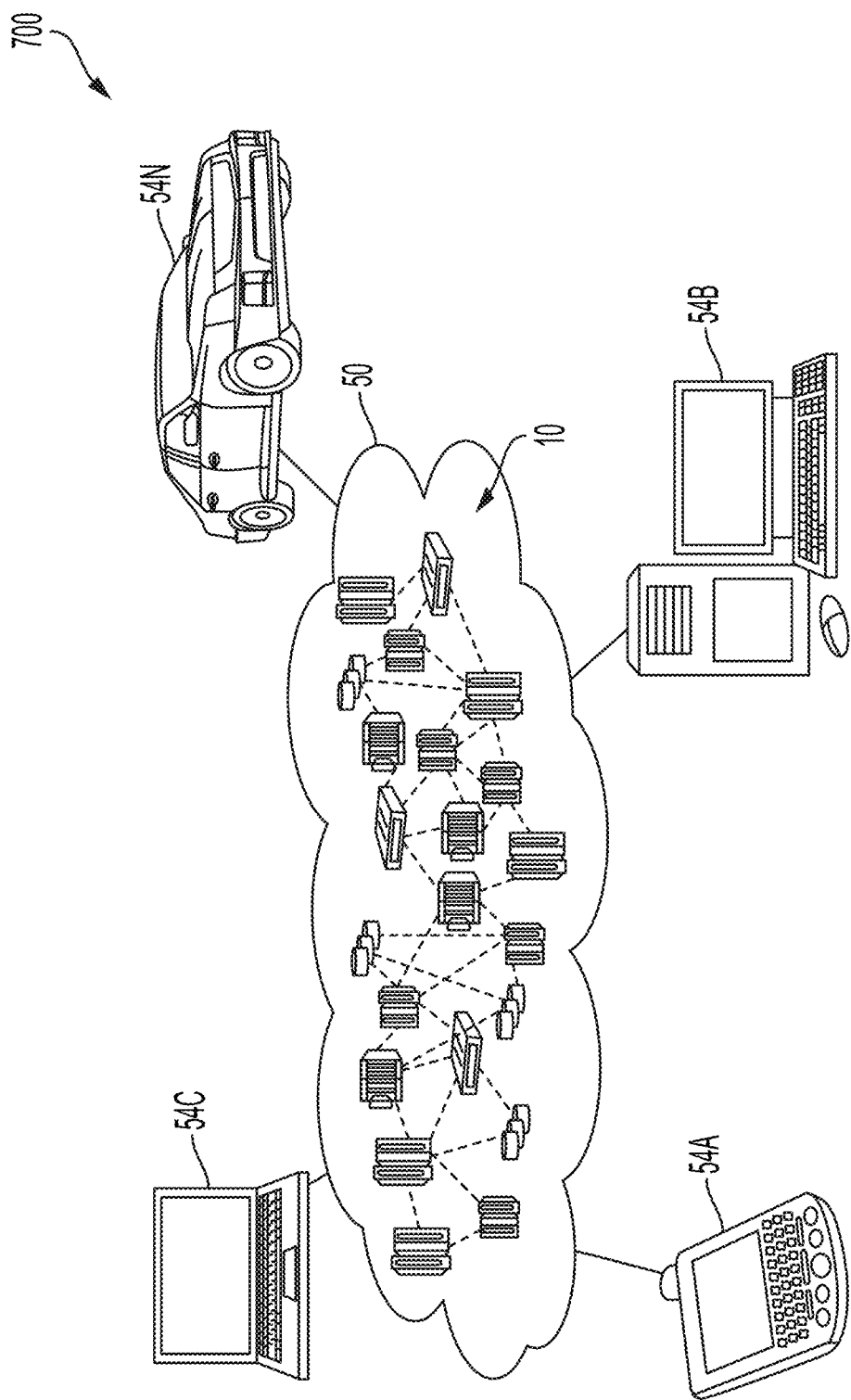
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
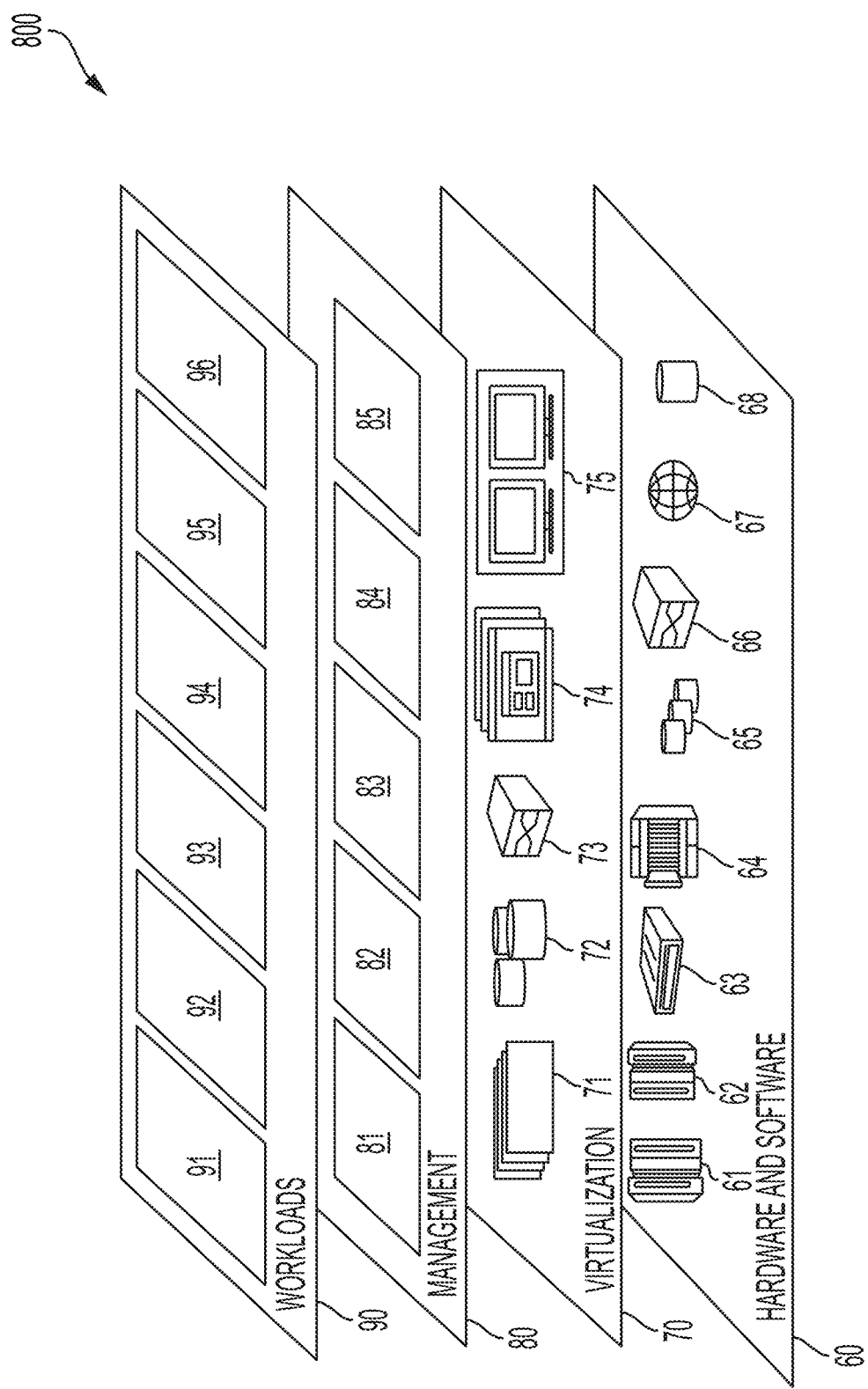
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Turning now to FIG. 9, a computer system 900 for performing textbook content reorganization based on classroom analytics is generally shown in accordance with one or more embodiments of the present invention. All or a portion of the computer system 900 shown in FIG. 9 can be implemented by one or more cloud computing nodes 10 of FIG. 7. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 900 therefore may include a general-purpose or mainframe computer 901 capable of running multiple instances of an O/S simultaneously.

In one or more exemplary embodiments of the present invention, in terms of hardware architecture, as shown in FIG. 9, the computer 901 includes one or more processors 905, memory 910 coupled to a memory controller 915, and one or more input and/or output (I/O) devices 940, 945 (or peripherals) that are communicatively coupled via a local input/output controller 935. The input/output controller 935 can be, for example but not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 935 may include a plurality of sub-channels configured to access the output devices 940 and 945. The sub-channels may include fiber-optic communications ports.

The processor 905 is a hardware device for executing software, particularly that stored in storage 920, such as cache storage, or memory 910. The processor 905 can be any custom made or commercially available processor, a central processing unit (CPU), an auxiliary processor among several processors associated with the computer 901, a semiconductor based microprocessor (in the form of a microchip or chip set), a macroprocessor, or generally any device for executing instructions.

The memory 910 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, and/or other types of storage media. Note that the memory 910 can have a distributed architecture, where various components are situated remote from one another, but can be accessed by the processor 905.

The instructions in memory 910 may include one or more separate programs, each of which comprises an ordered listing of executable instructions for implementing logical functions. In the example of FIG. 9, the instructions in the memory 910 a suitable operating system (OS) 911. The operating system 911 essentially controls the execution of other computer programs and provides scheduling, input-output control, file and data management, memory management, and communication control and related services.

In accordance with one or more embodiments of the present invention, the memory 910 may include multiple logical partitions (LPARs) each running an instance of an operating system. The LPARs may be managed by a hypervisor, which may be a program stored in memory 910 and executed by the processor 905.

In one or more exemplary embodiments of the present invention, a conventional keyboard 950 and mouse 955 can be coupled to the input/output controller 935. Other output devices such as the I/O devices 940, 945 may include input devices, for example but not limited to a printer, a scanner, microphone, and the like. Finally, the I/O devices 940, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 900 can further include a display controller 925 coupled to a display 930.

In one or more exemplary embodiments of the present invention, the system 900 can further include a network interface 960 for coupling to a network 965. The network 965 can be an IP-based network for communication between the computer 901 and any external server, client and the like via a broadband connection. The network 965 transmits and receives data between the computer 901 and external systems. In an exemplary embodiment, network 965 can be a managed IP network administered by a service provider. The network 965 may be implemented in a wireless fashion, e.g., using wireless protocols and technologies, such as WiFi, WiMax, etc. The network 965 can also be a packet-switched network such as a local area network, wide area network, metropolitan area network, Internet network, or other similar type of network environment. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 901 is a PC, workstation, intelligent device or the like, the instructions in the memory 910 may further include a basic input output system (BIOS) (omitted for simplicity). The BIOS is a set of essential software routines that initialize and test hardware at startup, start the OS 911, and support the transfer of data among the hardware devices. The BIOS is stored in ROM so that the BIOS can be executed when the computer 901 is activated.

When the computer 901 is in operation, the processor 905 is configured to execute instructions stored within the memory 910, to communicate data to and from the memory 910, and to generally control operations of the computer 901 pursuant to the instructions. In accordance with one or more embodiments of the present invention, computer 901 is an example of a cloud computing node 10 of FIG. 7.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
receiving, by a processor, observation data about an activity;
codifying the observation data to create codified observation data, the codifying comprising using natural language understanding (NLU) to normalize content of the observation data into categories;
identifying, by a content identification module executing on the processor, overlapping content of the observation data and a base electronic document, the content identification module trained using training data that includes user feedback on overlapping contents previously identified by the content identification module, the identifying comprising comparing the codified observation data to a codified base electronic document that comprises content of the base electronic document normalized into the categories;
comparing, by the processor, an order of the overlapping content in the observation data to an order of the overlapping content in the base electronic document;
changing, by the processor, an order of content in the base electronic document to create a modified electronic document based at least in part on the order of the overlapping content in the observation data being different than the order of the overlapping content in the base electronic document, wherein the modified electronic document comprises an index of entries that point to portions of the base electronic document.

2. The method of claim 1, wherein the activity is a learning activity in a classroom and the base electronic document is a textbook.

3. The method of claim 2, further comprising receiving feedback from a teacher of the learning activity, wherein an order of the modified electronic document is responsive to the feedback from the teacher.

4. The method of claim 1, wherein the activity is a workplace procedure and the base electronic document is an instruction manual.

5. The method of claim 1, further comprising receiving feedback from a participant of the activity, wherein an order of the modified electronic document is responsive to the feedback from the participant.

6. The method of claim 1, further comprising analyzing the base electronic document, the analyzing comprising extracting keywords from the base electronic document and developing keyword associations, wherein the identifying overlapping content is further responsive to one or both of the extracted keywords and the keyword associations.

7. The method of claim 1, wherein the observation data comprises one or both of visual data and audio data.

8. The method of claim 1, wherein the observation data comprises one or both of data extracted from smart tools and data extracted from uploaded documents.

9. The method of claim 1, wherein:
the content in the base electronic document comprises a plurality of portions each stored at a storage location on a storage device;
the base electronic document comprises a second index comprising entries that point to the storage locations on the storage device in the order of the content in the base electronic document.

10. The method of claim 1, wherein the modified electronic document has the same content as the base electronic document.

11. The method of claim 1, wherein the base electronic document is a previously modified electronic document.

12. A system comprising:
one or more processors for executing computer-readable instructions, the computer-readable instructions controlling the one or more processors to perform operations comprising:
receiving, by a processor, observation data about an activity;
codifying the observation data to create codified observation data, the codifying comprising using natural language understanding (NLU) to normalize content of the observation data into categories;
identifying, by a content identification module executing on the processor, overlapping content of the observation data and a base electronic document, the content identification module trained using training data that includes user feedback on overlapping contents previously identified by the content identification module, the identifying comprising comparing the codified observation data to a codified base electronic document that comprises content of the base electronic document normalized into the categories;
comparing, by the processor, an order of the overlapping content in the observation data to an order of the overlapping content in the base electronic document; and
changing, by the processor, an order of content in the base electronic document to create a modified electronic document based at least in part on the order of the overlapping content in the observation data being different than the order of the overlapping content in the base electronic document, wherein the modified electronic document comprises an index of entries that point to portions of the base electronic document.

13. The system of claim 12, wherein the activity is a learning activity in a classroom and the base electronic document is a textbook.

14. The system of claim 13, wherein the operations further comprise receiving feedback from a teacher of the learning activity, wherein an order of the modified electronic document is responsive to the feedback from the teacher.

15. The system of claim 12, wherein the operations further comprise receiving feedback from a participant of the activity, wherein an order of the modified electronic document is responsive to the feedback from the participant.

16. The system of claim 12, wherein the operations further comprise analyzing the base electronic document, the analyzing comprising extracting keywords from the base electronic document and developing keyword associations, wherein the identifying overlapping content is further responsive to one or both of the extracted keywords and the keyword associations.

17. The system of claim 12, wherein the observation data comprises one or both of visual data and audio data.

18. The system of claim 12, wherein the modified electronic document has the same content as the base electronic document.

19. A computer program product comprising a non-transitory computer-readable storage medium having program instructions embodied therewith, the program instructions executable by one or more processors to cause the one or more processors to perform operations comprising:
receiving, by a processor, observation data about an activity;
codifying the observation data to create codified observation data, the codifying comprising using natural language understanding (NLU) to normalize content of the observation data into categories;
identifying, by a content identification module executing on the processor, overlapping content of the observation data and a base electronic document, the content identification module trained using training data that includes user feedback on overlapping contents previously identified by the content identification module, the identifying comprising comparing the codified observation data to a codified base electronic document that comprises content of the base electronic document normalized into the categories;
comparing, by the processor, an order of the overlapping content in the observation data to an order of the overlapping content in the base electronic document; and
changing, by the processor, an order of content in the base electronic document to create a modified electronic document based at least in part on the order of the overlapping content in the observation data being different than the order of the overlapping content in the base electronic document, wherein the modified electronic document comprises an index of entries that point to portions of the base electronic document.

20. The computer program product of claim 19, wherein the operations further comprise analyzing the base electronic document, the analyzing comprising extracting keywords from the base electronic document and developing keyword associations, wherein the identifying is further responsive to one or both of the keywords and the keyword associations.

* * * * *